US005179785A

United States Patent [19]

Nagashima

[11] Patent Number: 5,179,785

[45] Date of Patent: Jan. 19, 1993

[54] CHAIN SAW GUIDE PLATE

[75] Inventor: Akira Nagashima, Tokyo, Japan

[73] Assignee: Kioritz Corporation, Tokyo, Japan

[21] Appl. No.: 658,074

[22] Filed: Feb. 20, 1991

[30] Foreign Application Priority Data

Feb. 23, 1990 [JP] Japan .............................. 2-17712[U]

[51] Int. Cl.[5] ...................... B23D 57/02; B23D 59/00; B27B 17/00

[52] U.S. Cl. ........................................ 30/382; 30/381; 30/383

[58] Field of Search .......................... 30/381, 382, 383

[56] References Cited

U.S. PATENT DOCUMENTS

| | | | |
|---|---|---|---|
| 2,527,251 | 10/1950 | Gorden | 30/385 |
| 2,826,294 | 3/1958 | Micqdemuc | 30/382 |
| 2,888,964 | 6/1959 | Mall . | |
| 3,124,177 | 3/1964 | Ekrud . | |
| 3,744,363 | 7/1973 | Espana et al. . | |
| 3,754,328 | 8/1973 | Knerr . | |
| 4,193,193 | 3/1980 | Holzworth | 30/382 |
| 4,297,786 | 11/1981 | Tuggle . | |
| 4,760,646 | 8/1988 | Siegler | 30/382 |
| 4,936,015 | 6/1990 | Levosinsky | 30/382 |

FOREIGN PATENT DOCUMENTS

| | | | |
|---|---|---|---|
| 671133 | 9/1963 | Canada | 30/382 |
| 1557256 | 5/1979 | United Kingdom . | |

*Primary Examiner*—Douglas D. Watts
*Assistant Examiner*—Paul M. Heyrana, Sr.
*Attorney, Agent, or Firm*—Bauer & Schaffer

[57] ABSTRACT

A guide roller is supported at the tip of the guide plate, over which the chain runs. A tip guard extends over the chain and projects forwardly from the support for the guide roller.

3 Claims, 2 Drawing Sheets

CHAIN SAW GUIDE PLATE

FIELD OF THE INVENTION

This invention relates to a guide plate assembly for guiding the chain of a chain saw used to fell and cut timber or the like.

BACKGROUND OF THE INVENTION

As shown in FIG. 3, a conventional chain saw comprises a body 1, a chain 2 on which are mounted a series of saw blades and which is driven by a prime mover such as an internal combustion engine provided within the body 1 and a guide plate 3 for guiding the chain 2 so that the chain 2 may be slidingly driven along the outer peripheral edge of the guide plate 3.

When the conventional chain saw of the above mentioned formation is continuously used, it will be quickly worn, particularly at the parts 4 represented by cross hatchings in the drawing—that is, above and below the tip of the guide plate 3.

Therefore, conventionally, a wear-resistant material such as an expensive Stellite melting deposition is applied to the outer peripheral edges of the tip on which the chain 2 slides in an attempt to reduce the frictional contact of the parts 4 represented by the cross hatchings so as to reduce wear.

However, there remains a defect in that the guide plate to which the Stellite melting deposition or the like has been applied is very expensive.

Also, in the conventional chain saw there exists another defect. Since that part of the chain saw 2 positioned at the tip extends directly outward, a harmful kickback occurs when this part is contacted with timber or the like during use. The so-called kickback phenomenon arises when the chain saw itself is suddenly kicked back toward the operator from its reaction with the timber or the like and is very dangerous.

BRIEF SUMMARY OF THE INVENTION

The present invention has as an object the provision of a guide plate assembly for a chain saw, on which the Stellite melting deposition is not needed and in which the early wear of the tip is prevented. Consequently, the cost of such chain saw can be reduced. Additionally, the invention effectively prevents kickback providing a high degree of safety.

According to the present invention, a guide roller for guiding the chain is supported at the tip of the guide plate by a supporting member and a tip guard, which extends outwardly of the running path of the chain to project from the supporting member.

According to the present invention, there are advantages that, as the guide roller is supported at the tip part by the supporting member, the Stellite melting deposition or the like is not needed. Early wear is prevented; and the cost is reduced. Also, as the running path of the chain over the guide roller at the tip is covered with the tip guard the tip of the chain will not contact timber or the like, kickback is effectively prevented, and safety is improved.

DETAILED DESCRIPTION OF THE INVENTION

Figure 1:
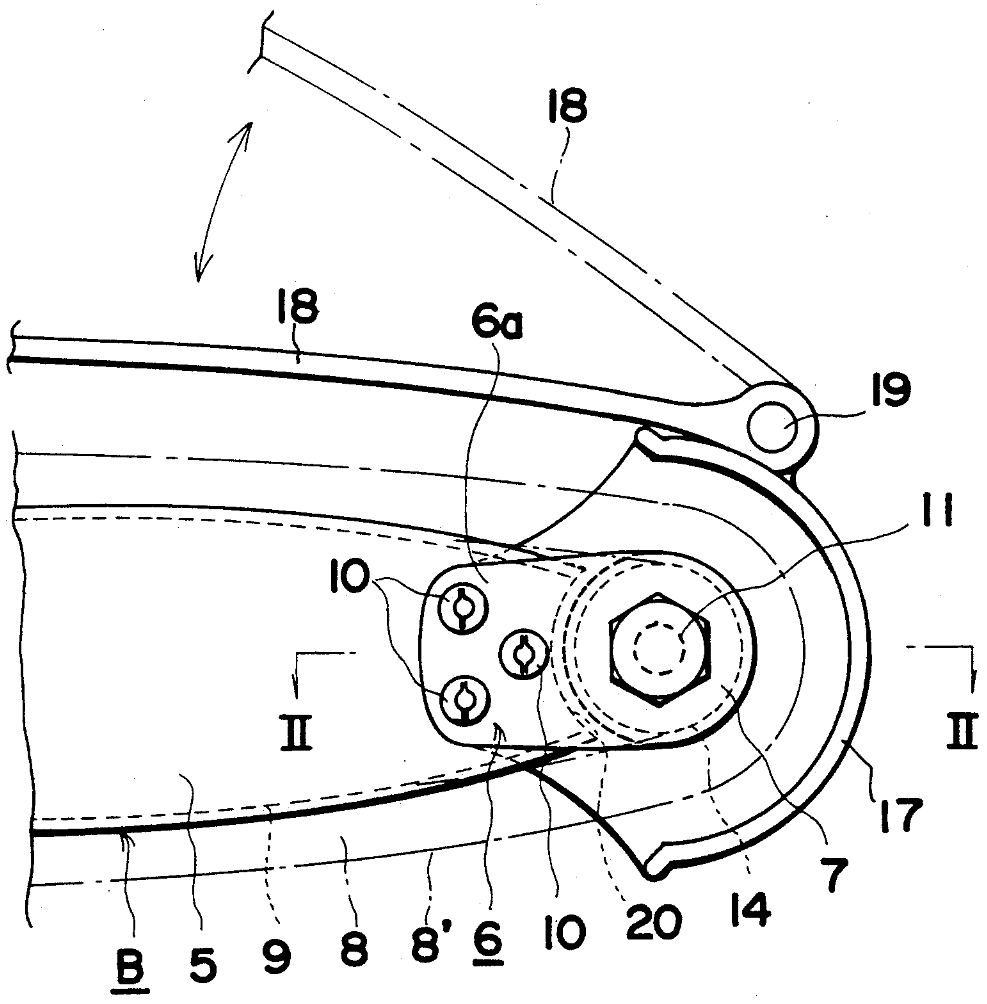
FIG. 1 is a side view showing the tip part of the guide plate of an embodiment of the present invention.

The present invention shall be explained in detail in the following on the basis of the embodiment shown in the drawings.

In the guide plate assembly, indicated generally by the letter B, the reference numeral 5 represents a guide plate, the numeral 6 represents a supporting member, and the numeral 7 represents a guide roller.

A guide groove 9 guiding a saw chain 8 is formed on the outer peripheral edge surface of the guide plate 5. In the illustrated example, the guide plate 5 is formed as a single plate but may be formed of three plates, i.e. two outside plates and a middle plate. The tip 20 of the guide plate 5 is incised to provide an arcuate recess at its tip 20 so as not to interfere with the rolling of the guide roller 7. The guide plate 5 is provided with a slot or the like, not illustrated, on the rear end (left side in FIG. 1) so as to be fitted to the chain saw body 1 by any conventional method.

Figure 2:
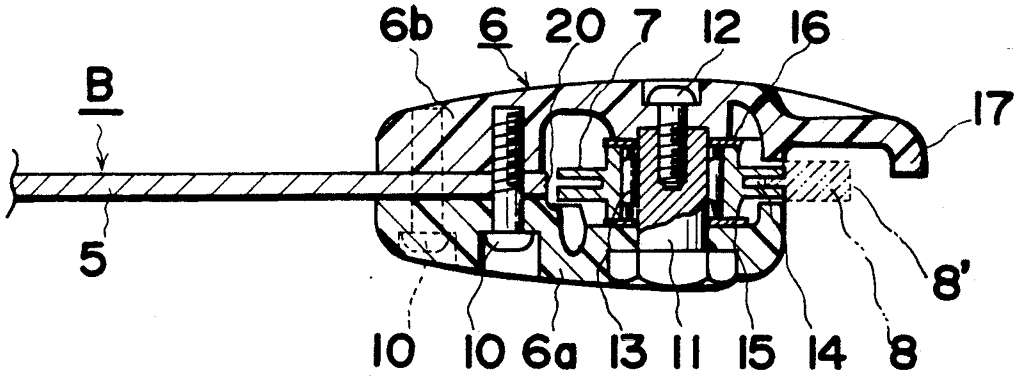
FIG. 2 is a sectioned view on line II—II as seen in the direction indicated by the arrows in FIG. 1.
Figure 3:
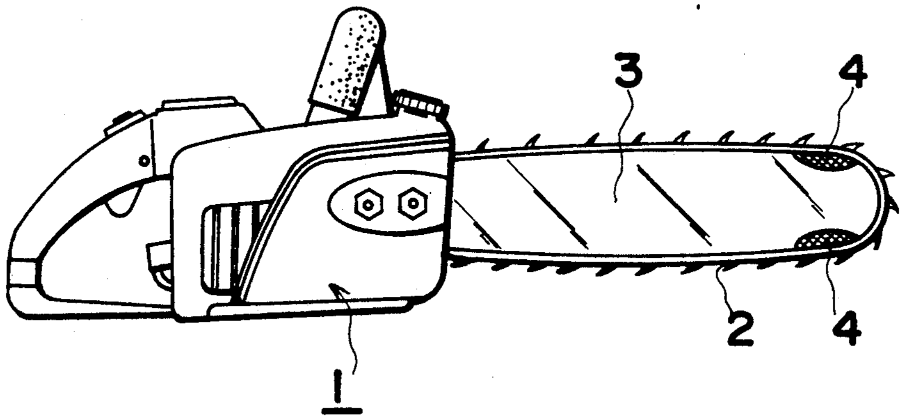
FIG. 3 is a side view of a conventional chain saw.

As shown in FIG. 2, the supporting member 6 is formed of a right side member **6*a* and a left side member 6*b* which are detachably clamped to the rear of the tip 20 on both right and left sides of the guide plate 5, being fixed with screws 10. Also, a headed shaft 11 is fixed with a screw 12 between the right side member 6*a* and the left side member 6*b* forward of the tip 20 to support a roller bearing 13 on which is journalled the guide roller 7. The roller 7 has formed about its periphery a guide groove 14 for receiving the driving links (not illustrated) of the chain 8. The bottom surface of this guide groove 14 is smooth and conforms to the bottom surface of the guide groove 9 formed on the outer peripheral edge of the guide plate 5 so that the saw chain 8 may be smoothly transferred from the guide plate to the roller. The reference numerals 15 and 16 in FIG. 2 represent annular sliding plates interposed on each side of the guide roller 7**.

A sprocket may be used for the guide roller 7. Further, a tip guard 17 extending integrally from the left side member **6*b* covers the outside of the running path 8' of the chain 8**.

In the embodiment shown in the drawings, a thin plate-like guard 18 covers the exposed exterior part of the chain 8 as it is guided on the outer peripheral edge of the upper part of the guide plate 5. The guard 18 is rotatably supported at its forward end by a pivot 19 locate on the upper edge of the tip guard 17. The thin guard 18 is biased counterclockwise as seen in FIG. 1 by a spring, not illustrated, and is normally urged to return to the position shown by the solid lines in FIG. 1 to prevent the operator or the like from being inquire by contacting the chain 8.

Also according to the construction shown in FIG. 2, the roller bearing 13 can be made comparatively wide. Therefore, a standard size roller bearing can be utilized to extend durability.

In the present invention, as shown in FIG. 1, the chain saw 8 is guided on the guide groove 9 in the outer peripheral edge of the guide plate body 5 and the guide groove 14 in the outer peripheral edge of the guide roller 7. Thus, the guide plate assembly B has the advantage that, as the guide roller 7, guiding the saw chain 8, is supported at the tip 20 by the supporting member 6, the Stellite melting deposition or the like is conventional, is not needed. Further, early wear is prevented, and the product is constructed at low cost. As the tip part of the running chain 8 is covered with the tip guard 17, projecting from the supporting member 6, the section of the chain 8 positioned at the tip will not contact timber or the like. Therefore, kickback is effectively prevented and safety is high.

As described above, the sections of the saw chain 8 guided on the outer peripheral edge of the upper part of the guide plate 5 is covered with the thin plate-like guard 18, providing an advantage that even if kickback occurs, the operator will be protected by the guard 18 and safety is even higher. When cutting wood of a large diameter, the thin plate-like guard 18 will automatically rotate clockwise, as seen by the imaginary lines in FIG. 1, so as not to be in the way of the operation.

Further, there are other advantages in that, unless the supporting member 6 is properly fitted to the plate 5, the operation of the chain saw will be impossible. Consequently, safe operation will be always secured.

As explained above, the present invention prevents early wear of the plate 8, even without applying a Stellite melting deposition or the like to the plate. Therefore, the guide plate can be provided at low cost. Also, the kickback can be effectively prevent, and the safety can be elevated.

What is claimed is:

1. In a chain saw having a chassis, a guide plate having means about its peripheral edge for guiding a saw chain disposed for running movement over the peripheral edge, and a freely rotating guide roller mounted at the forward tip of said guide plate, the improvement wherein said guide roller is journalled in a support separate from said guide plate, said support being detachably secured to the forward tip of said plate and being provided with a chain guard extending forwardly therefrom to overlie the nose of said saw chain, and an elongated saw chain cover pivotally mounted at one end on said roller support and extending rearwardly over the top run of said saw chain, said cover being liftable in response to the cutting of a workpiece larger than the transverse dimension of said guide plate.

2. The improvement according to claim 1, wherein said support is formed of two half portions adapted to e fastened together and clamped on either side of said guide plate, one of said support halves being formed with an extending forward portion covering said saw chain.

3. The improvement according to claim 1, wherein said rotatable roller is journalled on an axle secured between said support halves.

* * * * *